US009438566B2

(12) United States Patent
Zhang et al.

(10) Patent No.: US 9,438,566 B2
(45) Date of Patent: Sep. 6, 2016

(54) METHOD AND SYSTEM FOR NEGOTIATION BASED ON IKE MESSAGES

(71) Applicant: Huawei Technologies Co., Ltd., Shenzhen (CN)

(72) Inventors: Wei Zhang, Beijing (CN); Ruirui Liu, Beijing (CN); Wenhui Xie, Beijing (CN); Guolu Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 14/052,470

(22) Filed: Oct. 11, 2013

(65) Prior Publication Data

US 2014/0108781 A1    Apr. 17, 2014

(30) Foreign Application Priority Data

Oct. 12, 2012   (CN) .......................... 2012 1 0387149
Sep. 29, 2013   (CN) .......................... 2013 1 0459948

(51) Int. Cl.
*H04L 29/06*          (2006.01)

(52) U.S. Cl.
CPC ............. *H04L 63/04* (2013.01); *H04L 63/061* (2013.01); *H04L 63/164* (2013.01)

(58) Field of Classification Search
CPC ..................... H04L 29/0659; H04L 29/06986; H04L 63/04; H04L 12/66
USPC ......................................................... 713/151
See application file for complete search history.

(56) References Cited

U.S. PATENT DOCUMENTS

| 7,266,715 | B1   | 9/2007  | Bazzinotti et al.          |
|-----------|------|---------|----------------------------|
| 7,836,497 | B2 * | 11/2010 | Hossain ........ H04L 45/586 |
|           |      |         | 726/1                      |
| 2008/0155677 | A1   | 6/2008  | Hossain et al.          |
| 2011/0067089 | A1 * | 3/2011  | Allard ........... H04L 63/164 |
|           |      |         | 726/3                      |
| 2011/0299386 | A1 * | 12/2011 | Negoto ........... H04L 45/28 |
|           |      |         | 370/221                    |
| 2012/0281522 | A1 * | 11/2012 | Kumar ........... H04L 63/164 |
|           |      |         | 370/217                    |

FOREIGN PATENT DOCUMENTS

| CN | 101577725 A | 11/2009 |
| CN | 101605060 A | 12/2009 |
| CN | 101714916 A | 5/2010  |

OTHER PUBLICATIONS

Singh et al., "Protocol Support for High Availability of IKEv2/IPsec", Jul. 2011, pp. 1-26, https://tools.ietf.org/html/rfc6311.*
International Search Report and Written Opinion received in Application No. PCT/CN2013/085132 mailed Jan. 16, 2014, 10 pages.
Extended European Search Report received in Application No. 13188281.3-1870 mailed Mar. 12, 2014, 7 pages.
Kalyani, G. "IKEv2/IPsec SA counter synchronizatin draft-kagarigi-ipsecme-ikev2-windowsync-04," Network Working Group, Jan. 30, 2011, 14 pages.

* cited by examiner

*Primary Examiner* — Izunna Okeke
*Assistant Examiner* — Hee Song
(74) *Attorney, Agent, or Firm* — Slater Matsil, LLP

(57) ABSTRACT

The present invention provides a method and a system for negotiation based on IKE messages. A standby device updates a value of a stored third identity according to an update notification of an active device. The update notification of the active device is sent by the active device after updating a value of a stored second identity. When the standby device switches to a new active device, the new active device sends a second message for negotiating IPSec information to a peer device according to the updated third identity. The third identity is an identity that is stored in the standby device and used to acquire state information of the active device.

16 Claims, 14 Drawing Sheets

METHOD AND SYSTEM FOR NEGOTIATION BASED ON IKE MESSAGES

CROSS-REFERENCE TO RELATED APPLICATION

This application claims priority to Chinese Patent Application No. 201210387149.0, filed on Oct. 12, 2012 and Chinese Patent Application No. 201310459948.9, filed on Sep. 29, 2013, both of which are hereby incorporated by reference in their entireties.

TECHNICAL FIELD

Embodiments of the present invention relate to communications technologies, and in particular, to a method and a system for negotiation based on IKE (Internet Key Exchange) messages.

BACKGROUND

The Internet Key Exchange Protocol version 2 (Internet Key Exchange Protocol Version 2, abbreviated as IKEv2) is used to authenticate a security association (Security Association, abbreviated as SA) and negotiate keys on a virtual private network (Virtual Private Network, abbreviated as VPN) and is related information required by both communication parties on the VPN to negotiate Internet Protocol security (IP Security, abbreviated as IPSec) communications, for example, encryption algorithm, session key, authentication of both communication parties, and the like.

The IKEv2 negotiation is divided into initial exchange, auth exchange, create child exchange, and informational exchange. Message headers of each IKEv2 message include a message id field (message identity), where the message id field is used to identify the sequence number of a message.

Generally, both communication parties store two message ids: a send_message_id (abbreviated as send_msgid) used when a request message is initiated, and a recv_message_id (abbreviated as recv_msgid) that is the message id of a message that expects to be received. After a communication originator sends a request (request) message for a message_id and receives a response (response) message of this request message, the send_message_id in the communication originator increases by 1. The recv_message_id increases by 1 each time when any communication side receives a request message.

In an IPSec host standby scenario, an active device (active member) is a device that is communicating with a peer device (peer device), and a standby device (standby member) is a backup device of the active device. When a fault occurs on a communication link between the active device and the peer device, the standby device is switched to a new active device to continue communication with the peer device.

If a fault occurs on the communication link between the active device and the peer device when the active device is performing an IKEv2 negotiation with the peer device, the standby device is switched to a new active device. Because the identity information in the original active device is not backed up into the standby device promptly, the message id in the standby device may be different from the message id in the active device. At this time, the communication with the peer device may be interrupted due to the wrong message id.

For example, during the IKEv2 negotiation, after the active device sends an msg1 to the peer device, the active device and the standby device are switched, and the updated information of the send_msgid of the active device is not backed up into the standby device promptly. In this way, the standby device is switched to a new active device, and the send_msgid is not updated. Therefore, the message_id of the new active device does not match the message_id of the peer device during the negotiation. As a result, services are interrupted for a long time.

SUMMARY

Therefore, the present invention provides a method and a system for negotiation based on IKE messages to solve the problem in the prior art that services are interrupted for a long time due to a switchover between an active device and a standby device.

In a first aspect, an embodiment of the present invention provides a method for negotiation based on IKE messages, including:

updating, by a standby device, a value of a stored third identity according to an update notification of an active device, where the update notification of the active device is sent by the active device after updating a value of a stored second identity; and when the standby device switches to a new active device, sending, by the new active device according to the updated third identity, a second message for negotiating Internet Protocol Security IPSec information to a peer device, where:

the third identity is an identity that is stored in the standby device and used to acquire state information of the active device.

With reference to the first aspect, in a possible implementation manner, before the step of updating, by a standby device, a value of an internal third identity according to an update notification of an active device, the method further includes:

sending, by the active device, a first message for negotiating IPSec information to the peer device, where the first message carries a first identity; and updating, by the active device, the value of the stored second identity, where:

the second identity is an identity that is stored in the active device and used to acquire state information of the active device.

With reference to the first aspect and the first implementation manner, in a second possible implementation manner, the first identity is message_id;

the second identity is next_sendmsg_id;

the third identity is next_sendmsg_id;

an initial value of the first identity, an initial value of the second identity, and an initial value of the third identity are the same and are all N;

accordingly, the updating, by the active device, the value of the stored second identity is specifically:

updating, by the active device, the value of the stored second identity to N+1; and the updating, by the standby device, a value of a stored third identity according to an update notification of an active device is specifically:

updating, by the standby device, the value of the stored third identity to N+1.

With reference to the first aspect and the second implementation manner, in a third possible implementation manner, the sending, by the new active device according to the updated third identity, a second message for negotiating IPSec information to a peer device is specifically:

sending, by the new active device, a second message for negotiating IPSec information to a peer device, where a value of the first identity carried in the second message is N+1.

With reference to the first aspect and the possible implementation manners, in a fourth possible implementation manner, the method further includes:

sending, by the new active device, a third message for negotiating IPSec information to the peer device, where a value of the first identity carried in the third message is N.

With reference to the first aspect, in a fifth possible implementation manner, before the step of updating, by a standby device, a value of an internal third identity according to an update notification of an active device, the method further includes:

receiving, by the active device, a first message for negotiating IPSec information, where the first message is sent by the peer device and carries a first identity; and updating, by the active device, a value of a second identity stored in the active device, and instructing the standby device to back up the value of the second identity.

With reference to the first aspect and the fifth possible implementation manner, in a sixth possible implementation manner, the first identity is message_id;

the second identity is recv_message_id;

the third identity is msgid_bk_flag;

initial values of the first identity and the second identity are N, and an initial value of the third identity is 0;

accordingly, the updating, by the active device, the value of the stored second identity is specifically:

updating, by the active device, the value of the stored second identity to N+1; and the updating, by the standby device, a value of an internal third identity according to an update notification of an active device is specifically:

updating, by the standby device, the value of the stored third identity to 1.

With reference to the first aspect and the sixth possible implementation manner, in a seventh possible implementation manner, the sending, by the new active device according to the updated third identity, a second message for negotiating IPSec information to a peer device specifically includes:

if the value of the third identity is 0, re-sending a second message for negotiating IPSec information to the peer device, where a value of the first identity carried in the second message is N and the second message carries a first SA; and if the value of the third identity is 1, resetting the value of the third identity to 0, updating the value of the second identity to N, and re-sending a second message for negotiating IPSec information to the peer device, where a value of the first identity carried in the second message is N and the second message carries a second SA.

In a second aspect, an embodiment of the present invention further provides a system for negotiation based on IKE messages, including an active device and a standby device, where:

the active device includes a first processor and a first memory; and the standby device includes a second processor and a second memory;

the second processor is configured to update, according to an update notification of the first processor, a value of a third identity stored in the second memory, where the update notification of the first processor is sent by the first processor after updating a value of a second identity stored in the first memory;

when the standby device switches to a new active device, the second processor is configured to send, according to the updated third identity in the second memory, a second message for negotiating Internet Protocol Security IPSec information to a peer device; and the third identity in the second memory is an identity used to acquire state information of the active device.

With reference to the second aspect, in a first possible implementation manner, before the second processor is configured to update, according to an update notification of the first processor, a value of a third identity stored in the second memory, the first processor is configured to send a first message for negotiating IPSec information to the peer device, where the first message carries a first identity; and the first processor is further configured to update the value of the second identity stored in the first memory, where:

the second identity is an identity used to acquire state information of the active device.

With reference to the second aspect and the first possible implementation manner, in a second possible implementation manner, the first identity is message_id;

the second identity is next_sendmsg_id;

the third identity is next_sendmsg_id;

an initial value of the first identity, an initial value of the second identity, and an initial value of the third identity are the same and are all N;

accordingly, that the first processor is further configured to update the value of the second identity stored in the first memory is specifically as follows:

the first processor is further configured to update the value of the second identity in the first memory to N+1; and that the second processor is configured to update, according to an update notification of the first processor, a value of a third identity stored in the second memory is specifically as follows:

the second processor updates a value of a third identity in the second memory to N+1.

With reference to the second aspect and the second implementation manner, in a third possible implementation manner, that the second processor is configured to send, according to the updated third identity in the second memory, a second message for negotiating IPSec information to a peer device is specifically as follows:

the second processor sends a second message for negotiating IPSec information to a peer device, where a value of the first identity carried in the second message is N+1.

With reference to the second aspect and the possible implementation manners, in a fourth possible implementation manner, the second processor is further configured to send a third message for negotiating IPSec information to the peer device, where a value of the first identity carried in the third message is N.

With reference to the second aspect, in a fifth possible implementation manner, before the second processor is configured to update, according to an update notification of the first processor, a value of a third identity stored in the second memory, the first processor is configured to receive a first message for negotiating IPSec information, where the first message is sent by the peer device and carries a first identity; and the first processor is further configured to update the value of the second identity stored in the first memory, and instruct the second processor to back up the value of the second identity into the second memory.

With reference to the second aspect and the fifth possible implementation manner, in a sixth possible implementation manner, the first identity is message_id;

the second identity is recv_message_id;

the third identity is msgid_bk_flag;

initial values of the first identity and the second identity are N, and an initial value of the third identity is 0;

accordingly, that the first processor updates the value of the second identity stored in the first memory is specifically as follows:

the first processor updates the value of the second identity in the first memory to N+1; and that the second processor is configured to update, according to an update notification of the first processor, a value of a third identity stored in the second memory is specifically as follows:

the second processor updates a value of a third identity in the second memory to 1.

With reference to the second aspect and the sixth implementation manner, in a seventh possible implementation manner, that the second processor is configured to send, according to the updated third identity in the second memory, a second message for negotiating IPSec information to a peer device specifically includes the following:

if the value of the third identity is 0, the second processor re-sends a second message for negotiating IPSec information to the peer device, where a value of the first identity carried in the second message is N and the second message carries a first security association SA; and if the value of the third identity is 1, the second processor resets the value of the third identity to 0, updates the value of the second identity to N, and re-sends a second message for negotiating IPSec information to the peer device, where a value of the first identity carried in the second message is N and the second message carries a second SA.

In a third aspect, the present invention further provides a communications system, including any one of the system for negotiation based on IKE messages.

As can be seen from the foregoing technical solutions, according to the method and the system for negotiation based on IKE messages in the embodiments of the present invention, after receiving an update notification of an active device, a standby device updates a value of a third identity stored in the standby device; when the standby device switches to a new active device, the new active device sends, according to the updated third identity, a second message for negotiating IPSec information to a peer device. In this way, the problem in the prior art that services are interrupted for a long time due to a switchover between the active device and the standby device is solved.

BRIEF DESCRIPTION OF DRAWINGS

To illustrate the technical solutions of the present invention more clearly, the following briefly describes the accompanying drawings for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following clearly describes the technical solutions in the embodiments of the present invention with reference to the accompanying drawings in the embodiments of the present invention. Apparently, the embodiments in the following description are merely a part of the embodiments of the present invention. Based on the following embodiments of the present invention, a person of ordinary skill in the art may derive other embodiments used to solve the technical issue of the present invention and achieve the technical effect of the present invention by making equivalent changes to some or all technical features, without any creative effort, where the equivalent changes evidently fall within the scope of the present invention.

A hot standby cluster (Hot standby cluster) means that two physical devices mutually back up information and perform the same security policy. In the hot standby cluster, only one device communicates with a peer end at any time; a large quantity of information and states (for example, send_msgid or recv_msgid) need to be synchronized between each device in the hot standby cluster. If devices are not synchronized promptly, services may be interrupted in the case of an active/standby switchover.

IPSec VPN services involve enterprises or persons in different geographical areas; when the enterprises or persons communicate through the Internet, most traffic of communications between them need to pass through unknown networks of the Internet because they are located in different physical areas, thereby failing to ensure the security of sending and receiving data on the networks. The IPSec protocol can provide a manner of establishing and managing a security tunnel for enterprises and users in different physical areas, and provide such services as authentication and encryption for transmitted data, thereby preventing data from being viewed or tampered illegally when the data is transmitted on the networks or through a public network.

In the prior art, a request message and a response message are required each time when both negotiating parties negotiate with respect to the IPSec VPN, for example, an active device sends a first message (for example, the request message) to a peer device, and the peer device returns a response message (for example, the response message) according to the first message, so that IPSec information is negotiated between the active device and the peer device.

Figure 1A:
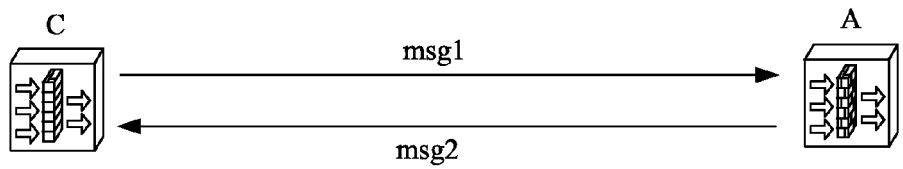
FIG. 1A and FIG. 1B illustrate a scenario of IKEv2 protocol message exchange.

For example, as shown in FIG. 1A, C (initiator) initiates a message 1 (abbreviated as msg1); after receiving the msg1, A (responder) returns a message 2 (abbreviated as msg2), and at this time A considers that the negotiation ends; after receiving the msg2, C considers that the negotiation ends. If the msg1 or the msg2 has message losses, C re-sends the msg1 in a preset time until C considers that the negotiation ends after receiving the msg2 or considers that the negotiation fails after re-sending the msg1 a certain number of times.

Figure 1B:
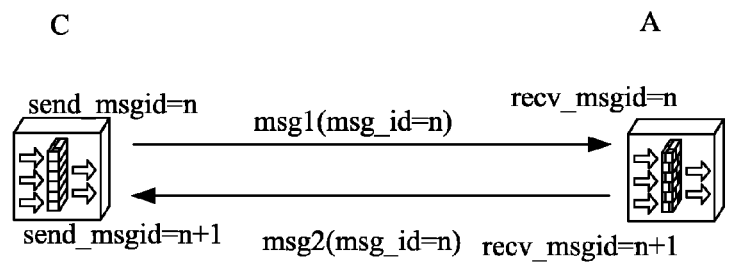

During the IKEv2 negotiation, there is a message id field in an IKE message header; in the same process of IKE negotiation, the initiator and the responder need to match the same message_id field. In addition, sending of IKE message exchange is permitted only once at the same time and in the same direction, as shown in FIG. 1B.

C actively initiates an msg1 whose message id is n, and the send_msgid of C is n at this time; after receiving the msg1, A returns a msg2 whose message id is n and considers that the negotiation ends; after A returns the msg2, the recv_msgid is updated to n+1; after receiving the msg2, C considers that the negotiation ends, and the send_msgid is updated to n+1.

If the msg1 or the msg2 has message losses, C re-sends the msg1 whose message id is n within a specified time period until C receives the msg2 whose message id is n or considers that the negotiation fails after re-sending the msg1 a certain number of times.

Figure 1C:
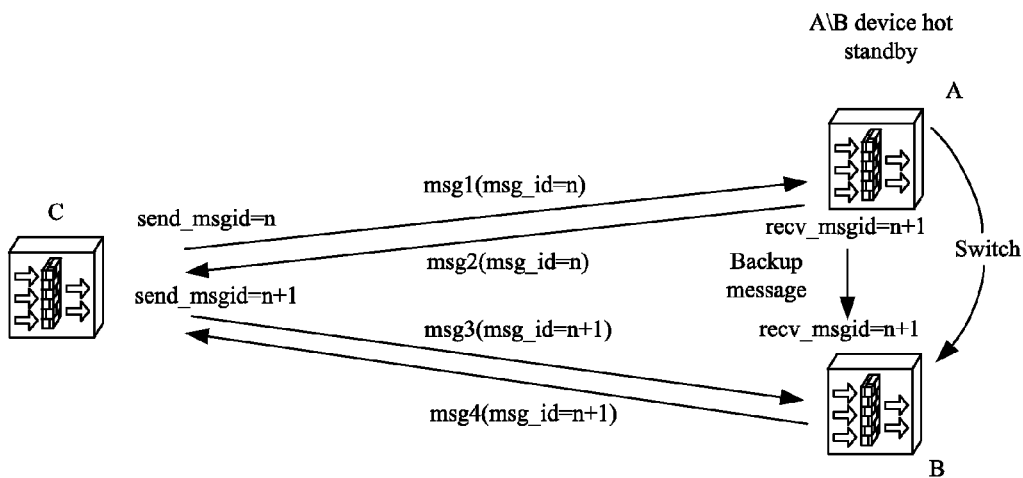
FIG. 1C and FIG. 1D illustrate a scenario of hot standby switching.

In an IPSec hot standby scenario, the message id of B is acquired by instant backup. As shown in FIG. 1C, after responding to a request message of C, A (active device) updates the recv_msgid, for example, recv_msgid=n+1, and sends a backup message including the recv_msgid to B (standby device), so that B backs up recv_msgid=n+1 according to the backup message. After the active device and the standby device are switched, B is capable of continuing to perform subsequent exchanges of the IKE SA (including informational and rekey) by using the backed up recv_msgid.

Figure 1D:
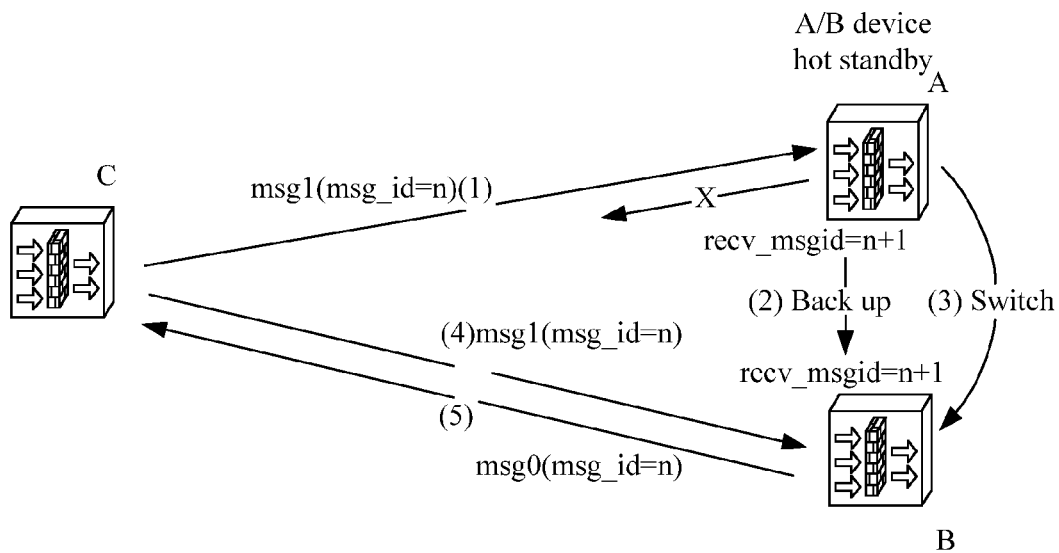

However, as shown in FIG. 1D, C initiates an IKE re-negotiation message msg1 (msg_id=n); after receiving the msg1, A considers that the negotiation succeeds, updates recv_msgid=n+1, and backs up recv_msgid=n+1 into B; at this time, a communication link between A and C is disconnected, and an active/standby switchover occurs. C fails to receive a response message, and re-sends the msg1 to B. The recv_msgid of B is n+1; after receiving the msg1 (msg_id=n), if B determines that the msg_id in the negotiation message is different from the stored recv_msgid, B may perform the following processing: (a) not respond; at this time, the negotiation between C and B fails, and a security association (security association, abbreviated as SA) of the initiator is deleted due to hard timeout; (b) return an Informational message; at this time, the negotiation between C and B fails, and the SA of the initiator is deleted due to hard timeout; (c) return a re-negotiation message (for example, a response message when B is set as a new active device); at this time, the SA negotiation between C and B is faulty, thereby causing service interruption between C and B.

For the foregoing (a) and (b) cases, the SA of the peer device is re-established due to hard timeout, and services can be recovered in a short time; for the (c) case, services are interrupted due to inconsistency between SAs of the two negotiating parties.

In addition, in the prior art, the RFC6311 proposes a solution to the foregoing problems. The standby device (standby member), acting as a new active device (active member), needs to send a message to negotiate a new pair of message ids with the peer end, where the new pair of message ids is used as message ids of subsequent messages; an ability to synchronize the message id is firstly negotiated by using a payload IKEV2_MESSAGE_ID_SYNC_SUPPORTED, and then a specific value of the message id is negotiated by using a payload IKEV2_MESSAGE_ID_SYNC.

However, both negotiating parties need to support the ability to synchronize the message id and support the processing of the following two payloads: IKEV2_MESSAGE_ID_SYNC_SUPPORTED and IKEV2_MESSAGE_ID_SYNC.

Most existing devices cannot support the sending and processing of these two payloads, and therefore the problem of long time service interruption cannot be solved. How to implement communication with the peer end without service interruption has become a technical problem that needs to be solved currently.

A method for negotiation based on IKE messages provided in embodiments of the present invention is mainly applied in an IKEv2/IPSec hot standby scenario to solve the following problem: In a process of IKEv2 negotiation, an active device (active member) is faulty due to some reasons; the active device and a standby device (standby member) are switched, and the standby device is switched to a new active device; when the new active device negotiates with a peer device, services between the new active device and the peer device are interrupted for a long time.

To solve the problem in the prior art, an embodiment of the present invention provides a method for negotiation based on IKE messages, where the method includes:

updating, by a standby device, a value of a stored third identity according to an update notification of an active device, where the update notification of the active device is sent by the active device after updating a value of a stored second identity; and when the standby device switches to a new active device, sending, by the new active device according to the updated third identity, a second message for negotiating IPSec information to a peer device.

It should be noted that the third identity is an identity that is stored in the standby device and used to acquire state information of the active device.

According to the method for negotiation based on IKE messages provided in the foregoing embodiment, a standby device acquires state information of an active device according to a value of a stored third identity; when the standby device switches to a new active device, the new active device can send, according to an updated third identity, a second message for negotiating IPSec information to a peer device.

Figure 2A:
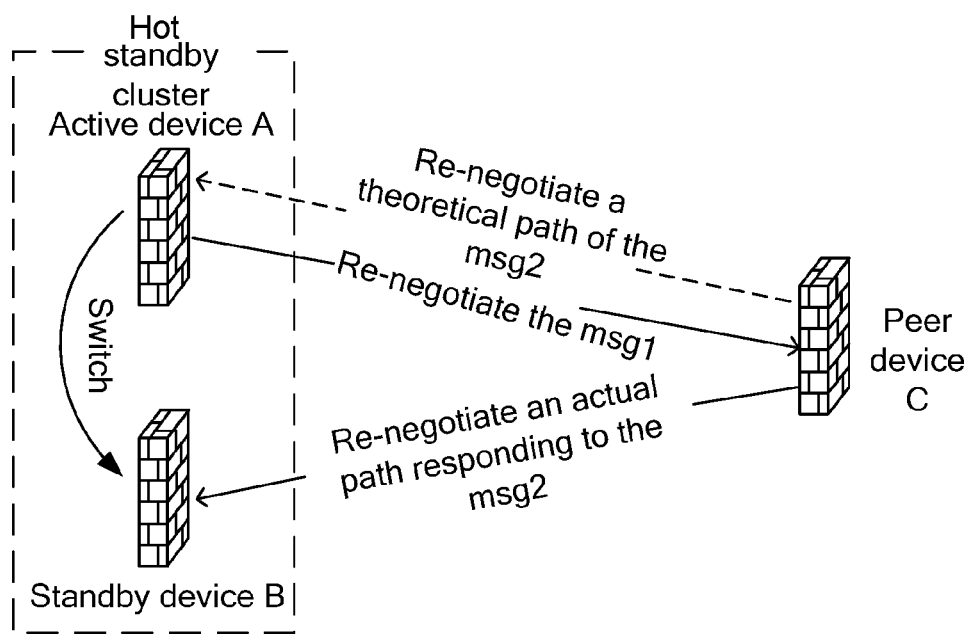
FIG. 2A illustrates a scenario of a negotiation method according to an embodiment of the present invention.
Figure 2B:
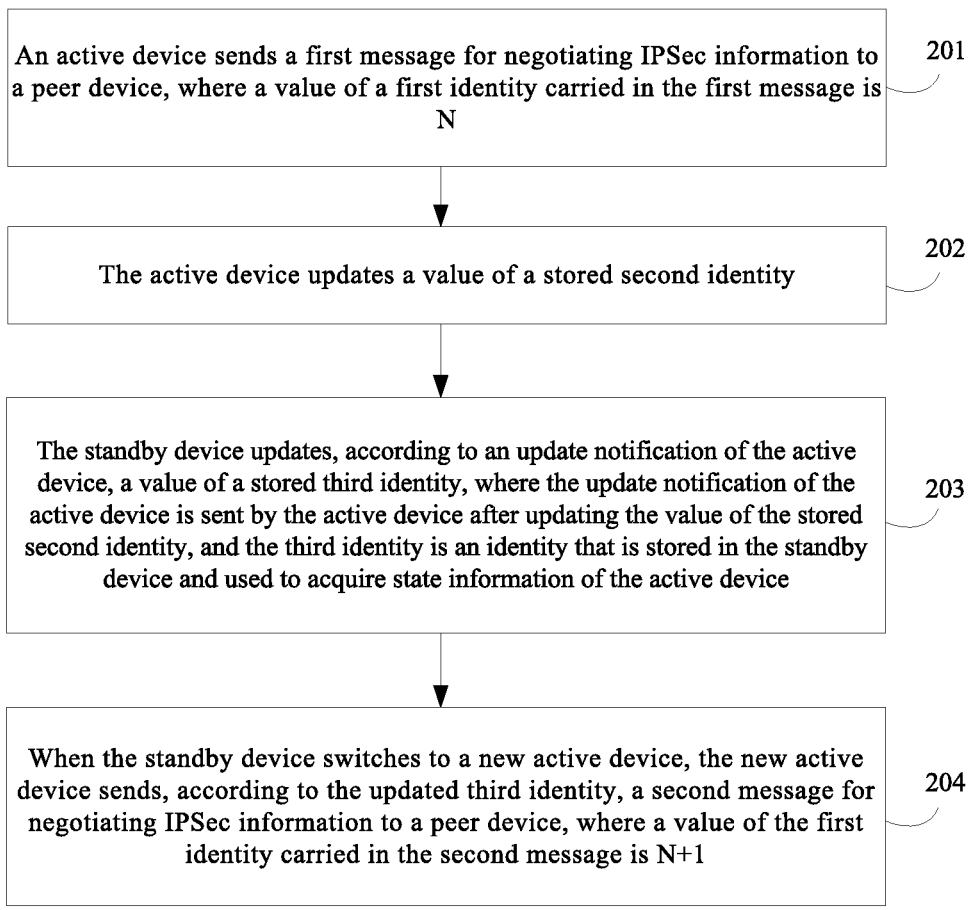
FIG. 2B is schematic flowchart of a method for negotiation based on IKE messages according to an embodiment of the present invention.

With reference to FIG. 2A and FIG. 2B, FIG. 2A illustrates a scenario of a method for negotiation based on IKE messages according to an embodiment of the present invention, and FIG. 2B is a schematic flowchart of a method for negotiation based on IKE messages according to an embodiment of the present invention. The method for negotiation based on IKE messages in this embodiment is described as follows:

201. An active device sends a first message for negotiating IPSec information to a peer device, where a value of a first identity carried in the first message is N (N is a natural number).

For example, in a process of IKEv2 negotiation, the first identity carried in the first message is message_id.

202. The active device updates a value of a stored second identity.

In this embodiment, the second identity is an identity that is stored in the active device and used to acquire state information of the active device. That is, before the send_message_id of the active device is updated, an identity that can record an intermediate state of the active device can be set, that is, the second identity. The second identity in this embodiment may be next_sendmsg_id.

203. The standby device updates, according to an update notification of the active device, a value of a stored third identity, where the update notification of the active device is sent by the active device after updating the value of the stored second identity, and the third identity is an identity that is stored in the standby device and used to acquire state information of the active device.

In this embodiment, the state information of the active device may be information about the intermediate state of the active device. It is understandable that currently, the active device in the stable state backs up the value of the send_message_id and the value of the recv_message_id into the standby device, while the information about the intermediate state of the active device cannot be backed up into the standby device. Therefore, an identity may be set in the standby device to acquire the information about the intermediate state of the active device, so that the standby device acquires the state of the active device promptly when an active/standby switchover is implemented.

In this embodiment, the third identity in the standby device is next_sendmsg_id. Certainly, in other embodiments, the third identity may be different from the second identity, which is an example only in this embodiment.

204. When the standby device switches to a new active device, the new active device sends, according to the updated third identity, a second message for negotiating IPSec information to the peer device, where a value of the first identity carried in the second message is N+1 (N is a natural number).

In an optional application scenario, the method for negotiation based on IKE messages may further include the following step 205 not illustrated in the figure.

205. The new active device confirms whether the negotiation ends.

For example, if the new active device receives a response message returned by the peer device, it considers that the negotiation based on IKE messages between the new active device and the peer device ends.

In the foregoing embodiment, when the standby device and the active device are switched, because the standby device can acquire the state information of the active device according to the stored third identity, the standby device is capable of promptly sending a message that can be parsed by the peer device to the peer device. In this way, it can be ensured that the negotiation between the new active device and the peer device is performed normally without affecting services.

In a preferred application scenario, to avoid interruption of services between the standby device and the peer device after the standby device switches to a new active device, the method for negotiation based on IKE messages may include steps 201 to 204 and further include the following step 205a not illustrated in the figure after step 204:

205a. The new active device sends a third message for negotiating IPSec information to the peer device, where a value of the first identity carried in the third message is different from the value of the first identity carried in the second message.

For example, if the value of the first identity carried in the second message is N+1, for example, message_id=N+1, the value of the first identity carried in the third message is N, for example, message_id=N.

It is understandable that the value of the first identity carried in the third message may be a value of the first identity carried in a message sent by the standby device when the standby device negotiates with the peer device for the first time.

For example, the second message and third message further include one of the following information:

IPSec information renegotiation, link deletion, link creation, message exchange, and the like.

Therefore, according to the method for negotiation based on IKE messages provided in this embodiment, after a standby device switches to a new active device, it sends a second message and a third message, so that a peer device is capable of identifying/parsing one of the second message and the third message, thereby effectively avoiding interruption of services between the new active device and the peer device.

Figure 2C:
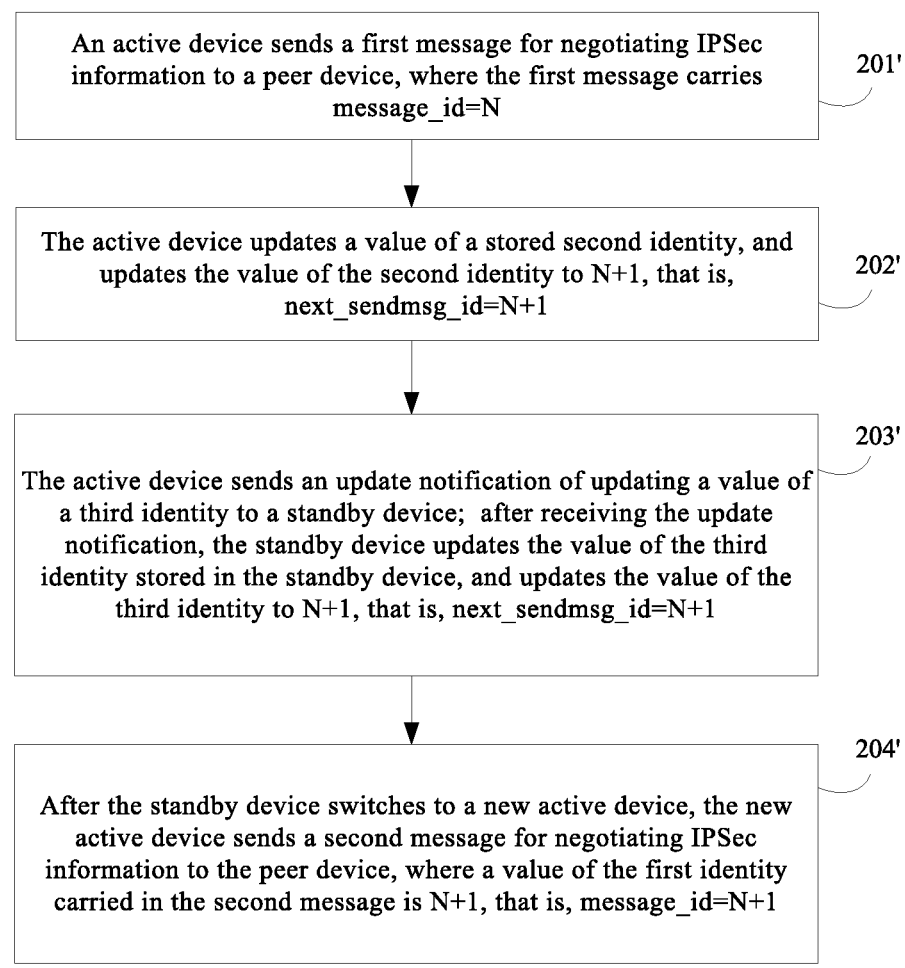
FIG. 2C is schematic flowchart of a method for negotiation based on IKE messages according to another embodiment of the present invention.

FIG. 2C is a schematic flowchart of a method for negotiation based on IKE messages according to an embodiment of the present invention. As shown in FIG. 2C, the method for negotiation based on IKE messages in this embodiment is described as follows:

According to the IKEv2 protocol, an active device stores send_message_id and recv_message_id.

When no fault occurs on a link between the active device and a peer device, the active device exchanges an IKE message with the peer device once to negotiate an SA, and the active device and the peer device perform another new negotiation after a certain interval. After the active device sends a first message (an identity carried in the first message is a first identity) to the peer device and receives a response message returned by the peer device, the value of the send_message_id in the active device increases by 1, that is, send_message_id=N+1.

In this embodiment, a second identity is also set in the active device to acquire state information of the active device. That is, the second identity, next_sendmsg_id, is used to identify information about an intermediate state of the active device; and a third identity, next_sendmsg_id, is set in the standby device, where the third identity is used to acquire the identity of the information about the intermediate state of the active device.

In particular, an initial value of the first identity, an initial value of the second identity, and an initial value of the third identity are the same and are all natural number N.

201'. The active device sends a first message for negotiating IPSec information to the peer device, where the first message carries message_id=N.

202'. The active device updates a value of the stored second identity, and updates the value of the second identity to N+1, that is, next_sendmsg_id=N+1.

203'. The active device sends an update notification of updating the value of the third identity to the standby device; after receiving the update notification, the standby device updates the value of the third identity stored in the standby device and updates the value of the third identity to N+1, that is, next_sendmsg_id=N+1.

204'. After the standby device switches to a new active device, the new active device sends a second message for negotiating IPSec information to the peer device, where a value of the first identity carried in the second message is N+1, that is, message_id=N+1.

It should be noted that the active device exchanges information with the standby device over the Virtual Router Redundancy Protocol (Virtual Router Redundancy Protocol, abbreviated as VRRP) and the HRP protocol (Huawei Redundancy Protocol), and when the active device is faulty, the active device and the standby device can be switched over the VRRP and/or HRP protocol. This is only an example of this embodiment illustrated to describe a switchover between the active device and the standby device. The switching can use any switching mode in the prior art, which is not limited by this embodiment.

Figure 2D:
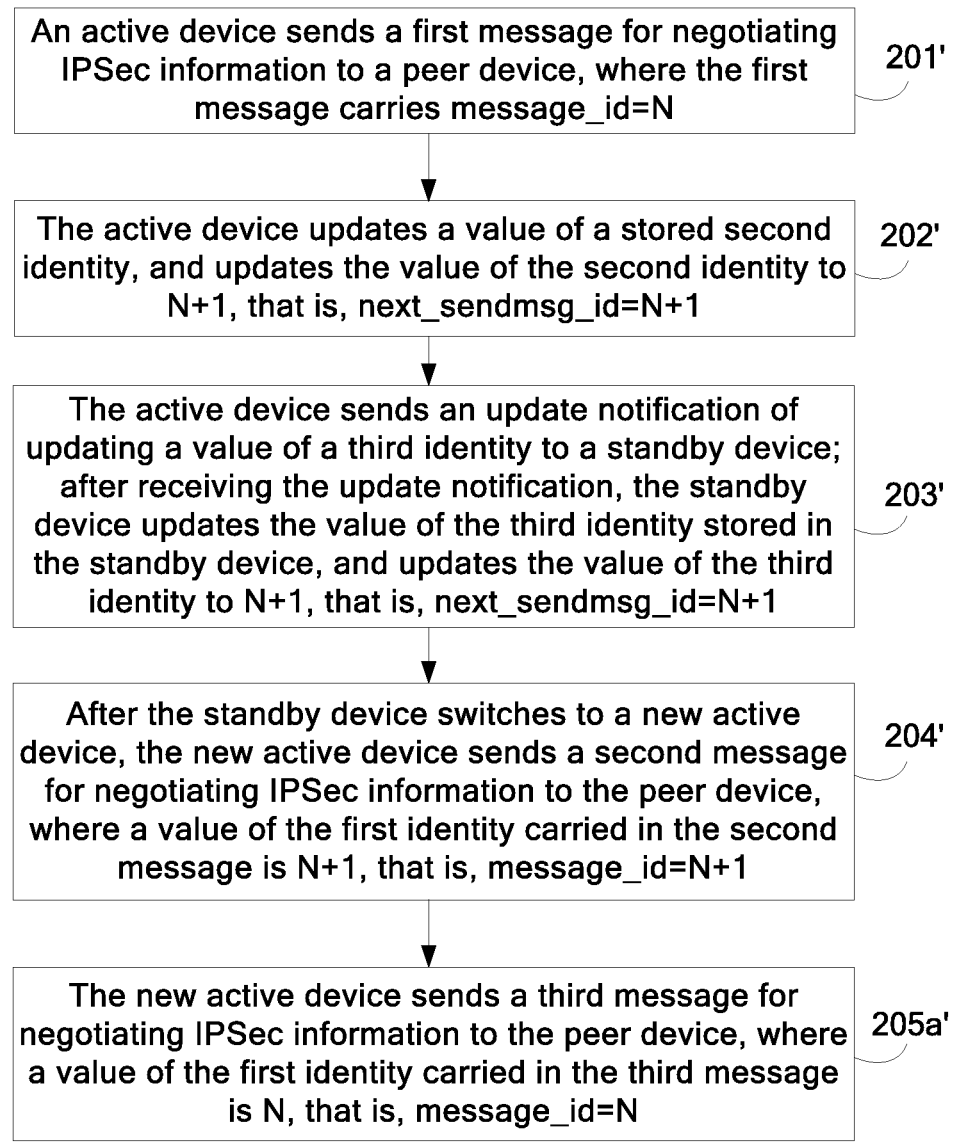
FIG. 2D is schematic flowchart of a method for negotiation based on IKE messages according to another embodiment of the present invention.

Alternatively, as shown in FIG. 2D, after step 204' and step 204, the method for negotiation based on IKE messages provided in this embodiment may further include the following step 205a'.

205a'. The new active device sends a third message for negotiating IPSec information to the peer device, where a value of the first identity carried in the third message is N, that is, message_id=N For example, the second request message and the third request message further include one of the following information:

IPSec information renegotiation, link deletion, link creation, message exchange, and the like.

As can be seen from the foregoing embodiment, according to the method for negotiation based on IKE messages in this embodiment of the present invention, after receiving an update notification of an active device, a standby device updates a value of an third identity stored in the standby device; when the standby device switches to a new active device, the new active device sends, according to the updated third identity, a second message for negotiating IPSec information to a peer device. In this way, the problem in the prior art that services are interrupted for a long time due to a switchover between the active device and the standby device is solved.

Figure 3:
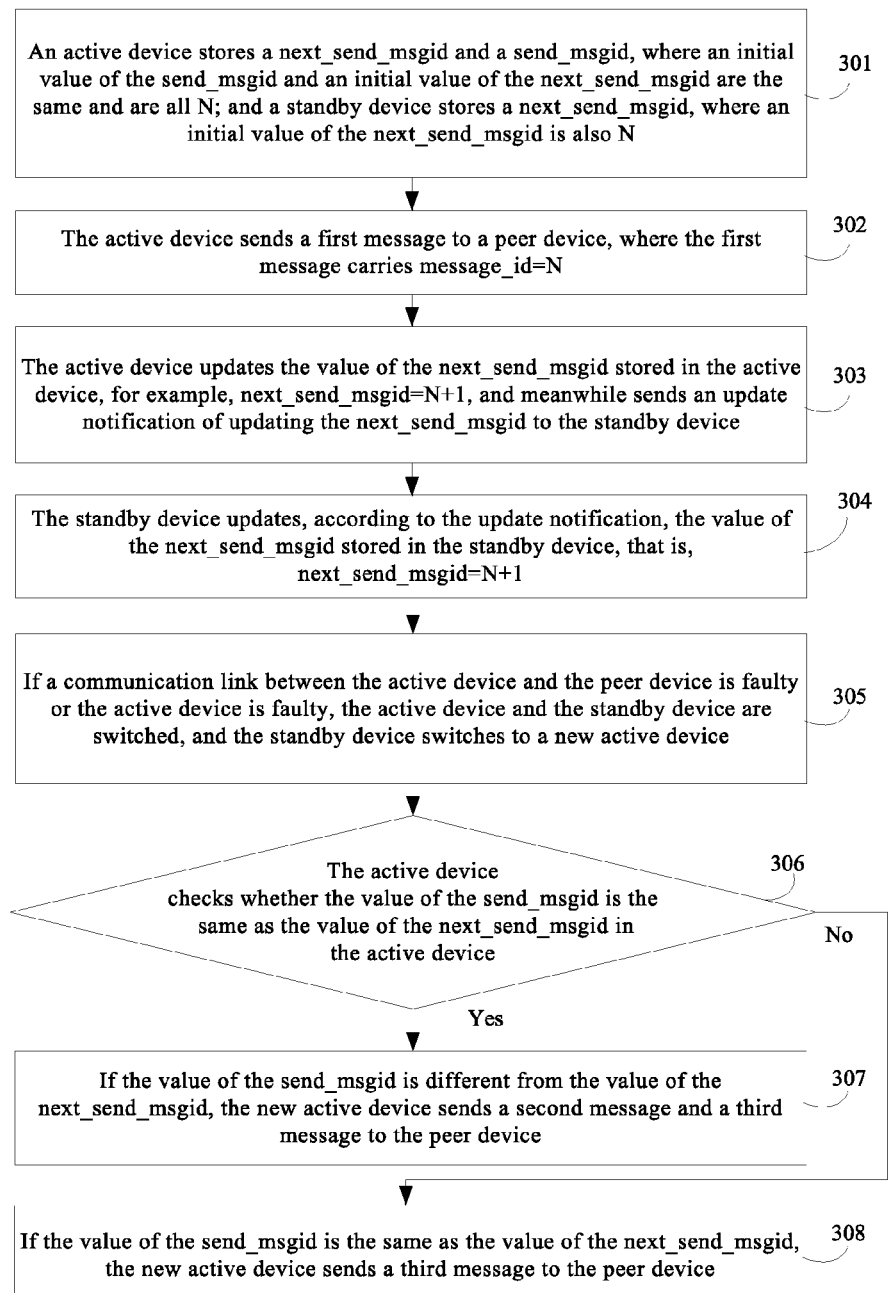
FIG. 3 is schematic flowchart of a method for negotiation based on IKE messages according to another embodiment of the present invention.

FIG. 3 is a schematic flowchart of a method for negotiation based on IKE messages according to an embodiment of the present invention. As shown in FIG. 3, the method for negotiation based on IKE messages in this embodiment is described as follows:

301. An active device stores next_send_msgid and send_msgid, where an initial value of the send_msgid and an initial value of the next_send_msgid are the same and are all N; and a standby device stores next_send_msgid, where an initial value of the next_send_msgid is also N.

302. The active device sends a first message (request message) to a peer device, where the first message carries message_id=N.

303. The active device updates the value of the next_send_msgid stored in the active device, for example, next_send_msgid=N+1, and meanwhile sends an update notification of updating the next_send_msgid to the standby device.

304. The standby device updates, according to the update notification, the value of the next_send_msgid stored in the standby device, that is, next_send_msgid=N+1.

305. If a communication link between the active device and the peer device is faulty or the active device is faulty, the active device and the standby device are switched, and the standby device switches to a new active device.

306. The new active device checks whether the value of the send_msgid is the same as the value of the next_send_msgid in the new active device; if the value of the send_msgid is different from the value of the next_send_msgid, step 307 is performed; otherwise, step 308 is performed.

When the standby device switches to a new active device, the send_msgid is equal to N and the next_send_msgid is equal to N+1 in the new active device.

307. If the value of the send_msgid is different from the value of the next_send_msgid in step 306, the new active device sends a second message and a third message to the peer device.

In this embodiment, the message_id carried in the second message is equal to N+1, and the message_id carried in the third message is equal to N.

It should be noted that the initial value of the message_id is the same as the initial value of the send_msgid.

The new active device sends the second message and the third message, so that the peer device is capable of identifying/parsing one of the foregoing messages, which avoids an occurrence of a phenomenon that services are interrupted because the peer device cannot identify/parse the request message sent by the new Active member.

Generally, the second message and the third message may include information about re-negotiation of the IPSec information, so that after receiving the foregoing messages, the peer device re-negotiates a new SA with the new active device.

308. If the value of the send_msgid is the same as the value of the next_send_msgid in step 306, the new active device sends a third message to the peer device.

For example, send_msgid=N and next_send_msgid=N, or send_msgid=N+1 and next_send_msgid=N+1.

That is, if the value of the send_msgid is the same as the value of the next_send_msgid+1, the new active device normally sends a request message for IKE negotiation. The new active device may not send a second message, and only need to directly send a message to be sent currently.

In this embodiment, when the foregoing fault occurs, the standby device may further use a double-detection method, that is, it may preferably send a message carrying message_id=N+1 as a message sequence number, and then sends a message carrying message_id=N as a message sequence number. This ensures that the peer device can correctly process the messages sent by the new active device, and solves the problem in the prior art that when the message ids of two negotiating parties are different in a process of IKEv2 negotiation, subsequent negotiations cannot be continued and services are interrupted for a long time.

Figure 4:
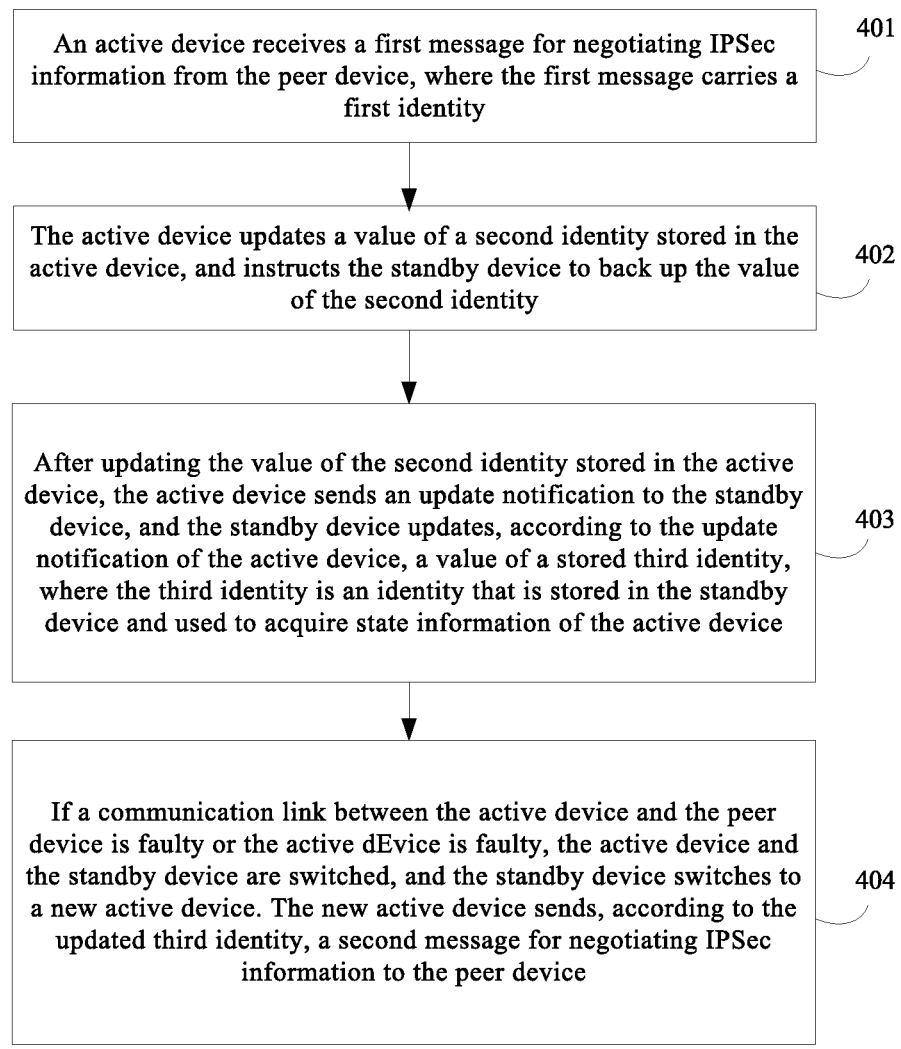
FIG. 4 is schematic flowchart of a method for negotiation based on IKE messages according to another embodiment of the present invention.

FIG. 4 is a schematic flowchart of a method for negotiation based on IKE messages according to an embodiment of the present invention. As shown in FIG. 4, the method for negotiation based on IKE messages in this embodiment is described as follows:

401. An active device receives a first message for negotiating IPSec information sent by a peer device, where the first message carries a first identity.

402. The active device updates a value of a second identity stored in the active device, and instructs a standby device to back up the value of the second identity.

403. After updating the value of the second identity stored in the active device, the active device sends an update notification to the standby device, and the standby device updates, according to the update notification of the active device, a value of a stored third identity, where the third identity is an identity that is stored in the standby device and used to acquire state information of the active device.

404. If a communication link between the active device and the peer device is faulty or the active device is faulty, the active device and the standby device are switched, and the standby device switches to a new active device. The new active device sends, according to the updated third identity, a second message for negotiating IPSec information to the peer device.

If the value of the third identity is 0, a second message for negotiating IPSec information is re-sent to the peer device, where a value of the first identity carried in the second message is N and the second message carries a first SA.

If the value of the third identity is 1, the value of the third identity is reset to 0, the value of the second identity is updated to N, and a second message for negotiating IPSec information is re-sent to the peer device, where a value of the first identity carried in the second message is N and the second message carries a second SA.

In this embodiment, the first identity may be message_id, the second identity may be recv_message_id, and the third identity may be msgid_bk_flag.

Initial values of the first identity and the second identity are N, and an initial value of the third identity is 0.

Similarly, in step 402, the active device may update the value of the stored second identity to N+1; in step 403, the standby device may update the value of the stored third identity to 1.

In this embodiment, when a standby device switches to a new active device, it may send a message to a peer device according to a value of a third identity, so that the message sent by the new active device can be parsed by the peer device, which solves the problem in the prior art that when message ids of two negotiating parties are different in a process of IKEv2 negotiation, subsequent negotiations cannot be continued and services are interrupted for a long time.

Figure 5A:
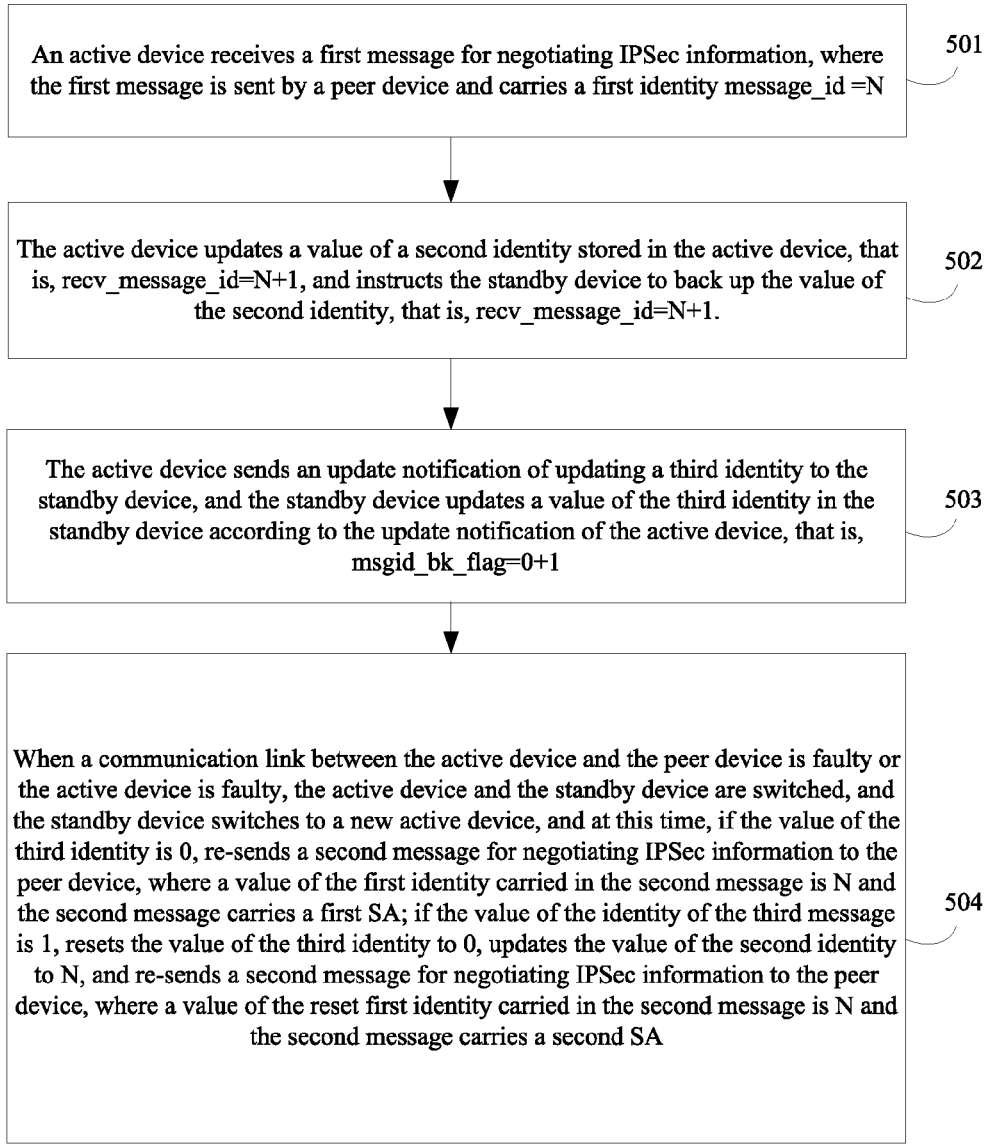
FIG. 5A is schematic flowchart of a method for negotiation based on IKE messages according to another embodiment of the present invention.

FIG. 5a is a schematic flowchart of a method for negotiation based on IKE messages according to an embodiment of the present invention. As shown in FIG. 5a, the method for negotiation based on IKE messages in this embodiment is described as follows:

In this embodiment, according to the IKEv2 protocol, send_message_id and recv_message_id exist in an active device, where initial values of both the send_message_id and the recv_message_id are N, and N is a natural number.

When no fault occurs on a link between the active device and a peer device, the active device exchanges an IKE message with the peer device once to negotiate and establish an SA, and the active device and the peer device perform a new negotiation after a certain interval. After receiving a first message sent by the peer device, the active device updates the value of the recv_message_id, that is, recv_message_id=N+1; the active device returns a response message to the peer device, and after receiving the response message, the peer device updates the send_message_id stored in the peer device to N+1. The first message carries a first identity, that is, a message_id.

In this embodiment, the receiving identity recv_message_id in the active device is a second identity, and a third identity msgid_bk_flag is set in the standby device, where an initial value of the third identity is 0.

Alternatively, a third identity, that is, an msgid_bk_flag may also be set in the active device.

501. The active device receives a first message for negotiating IPSec information, where the first message is sent by the peer device and carries the first identity message_id=N, and N is a natural number.

502. The active device updates the value of the second identity stored in the active device, that is, recv_message_id=N+1, and instructs the standby device to back up the value of the second identity, that is, recv_message_id=N+1.

503. The active device sends an update notification of updating the third identity to the standby device, and the standby device updates the value of the third identity in the standby device according to the update notification of the active device, that is, msgid_bk_flag=0+1.

504. When a communication link between the active device and the peer device is faulty or the active device is faulty, the active device and the standby device are switched, and the standby device switches to a new active device, and at this time, if the value of the third identity is 0, re-sends a second message for negotiating IPSec information to the peer device, where a value of the first identity carried in the second message is N and the second message carries a first SA; and if the value of the identity of the third message is 1, resets the value of the third identity to 0, updates the value of the second identity to N, and re-sends a second message for negotiating IPSec information to the peer device, where a value of the first identity carried in the second message is N and the second message carries a second SA.

In this embodiment, the first SA is different from the second SA, and the first SA may be an SA sent by the original active device in advance.

The third identity is an identity that is stored in the standby device and used to acquire state information of the active device.

Figure 5B:
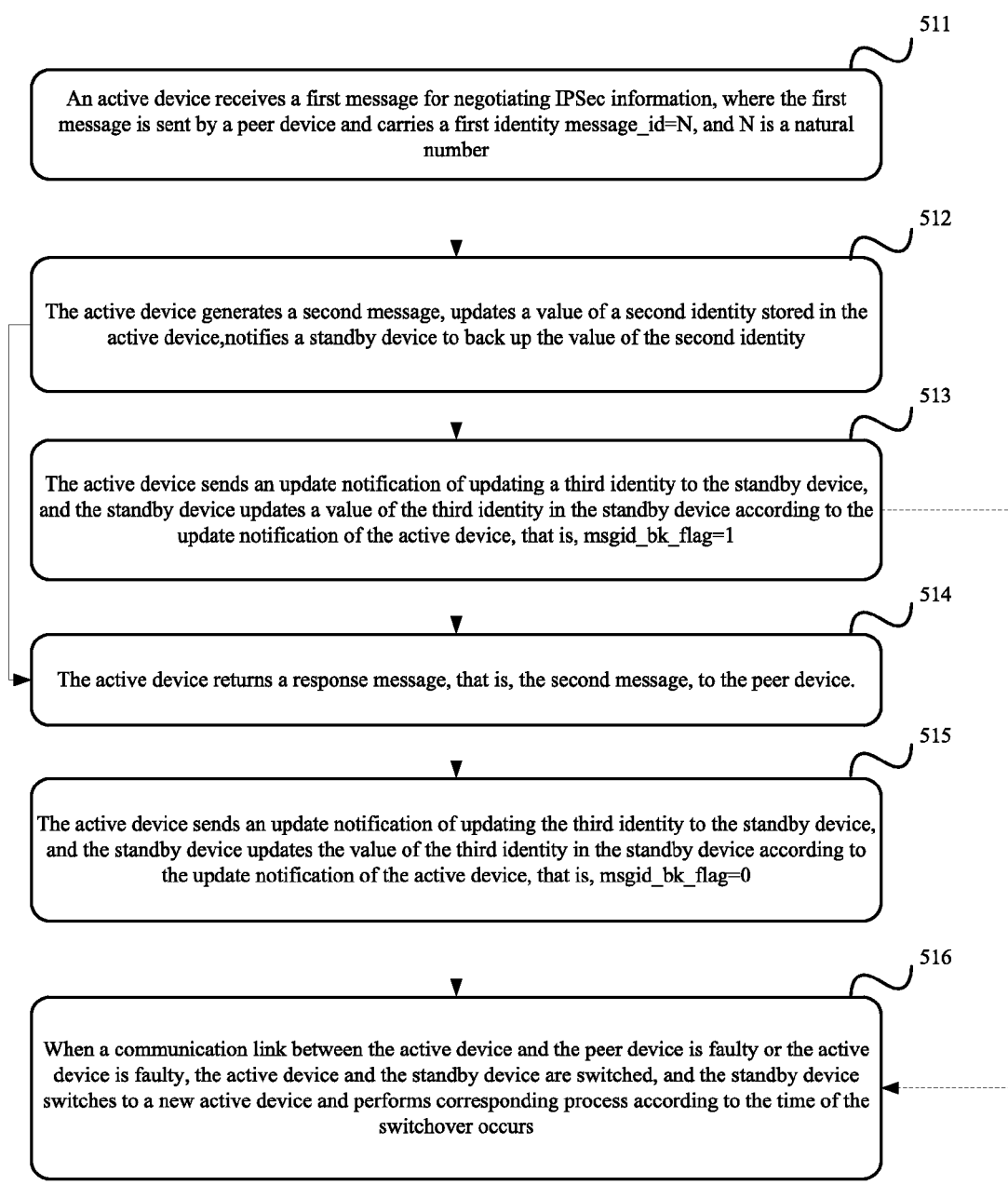
FIG. 5B is schematic flowchart of a method for negotiation based on IKE messages according to another embodiment of the present invention.

As shown in FIG. 5b, FIG. 5b is a schematic flowchart of a method for negotiation based on IKE messages according to an embodiment of the present invention. The method for negotiation based on IKE messages in this embodiment is described as follows:

In this embodiment, an initial value of a recv_message_id is N.

511. An active device receives a first message for negotiating IPSec information, where the first message is sent by a peer device and carries a first identity message_id=N, and N is a natural number.

512. The active device generates a second message, where the second message is a response message of the first message, a value of the first identity carried in the second message is N, that is, message_id=N, and the second message carries a first SA; updates a value of a second identity stored in the active device, that is, recv_message_id=N+1; and notifies a standby device to back up the value of the second identity, that is, recv_message_id=N+1.

513. The active device sends an update notification of updating a third identity to the standby device, and the standby device updates a value of the third identity in the standby device according to the update notification of the active device, that is, msgid_bk_flag=1.

514. The active device returns a response message, that is, the second message, to the peer device.

515. The active device sends an update notification of updating the third identity to the standby device, and the standby device updates the value of the third identity in the standby device according to the update notification of the active device, that is, msgid_bk_flag=0.

During processing on the received message (referring to the period starting from the time when the first message is received and before the response message, that is, the second message, corresponding to the first message is sent), the active device instructs, by sending an update notification, the standby device to set the value of the third identity to 1, that is, msgid_bk_flag=1. After completing the processing on the received message (after sending the response message, that is, the second message, corresponding to the first message), the active device instructs, by sending another update notification, the standby device to set the value of the third identity to 0, that is, msgid_bk_flag=0.

516. When a communication link between the active device and the peer device is faulty or the active device is faulty, the active device and the standby device are switched, and the standby device switches to a new active device and performs corresponding process according to the time of the switchover occurs. The switchover between the active device and the standby device may occur when the active device is processing the received message and may also occur after the active device completes the processing on the received message.

When the switchover occurs, if the value of the third identity is 0 (that is, the original active device completes the processing on the received message, the original active device in stable state), the new active device re-sends the second message for negotiating IPSec information to the peer device, where the value of the first identity carried in the second message is N, the second message carries the first SA, and the first SA is synchronized by the original active device to the new active device; and if the value of the third identity is 1 (that is, the original active device is processing the received message, the original active device in intermediate state), the new active device resets the value of the third identity to 0, updates the value of the second identity to N, and generates a third message, where a value of the first identity carried in the third message is N, and the third message carries a second SA.

The method for negotiation based on IKE messages provided in this embodiment improves reliability of IPSec hot standby, and solves the problem in the prior art that when message ids of two negotiating parties are different in a process of IKEv2 negotiation, subsequent negotiations cannot be continued and services are interrupted for a long time, thereby ensuring that both negotiating parties can normally perform subsequent negotiations.

Figure 6A:
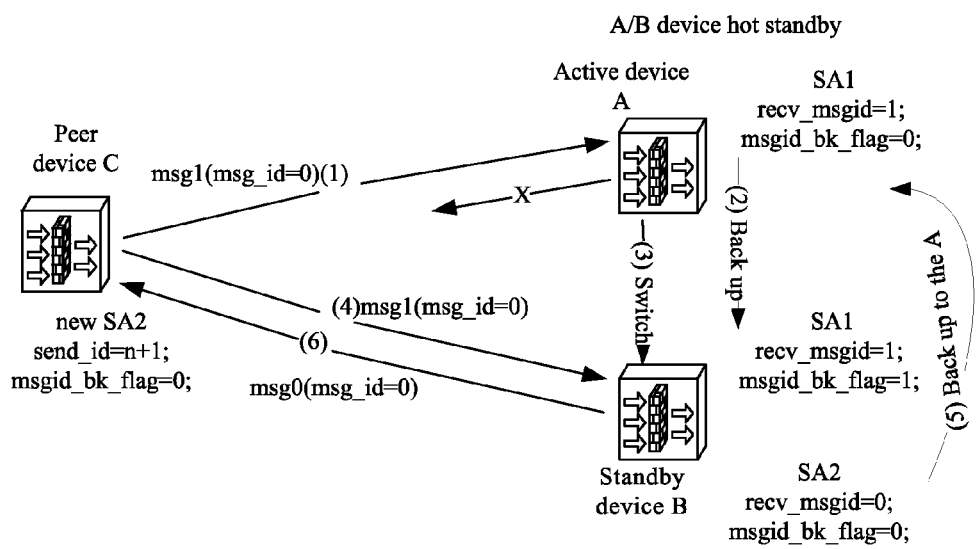
FIG. 6A illustrates a scenario of a method for negotiation based on IKE messages according to another embodiment of the present invention.
Figure 6B:
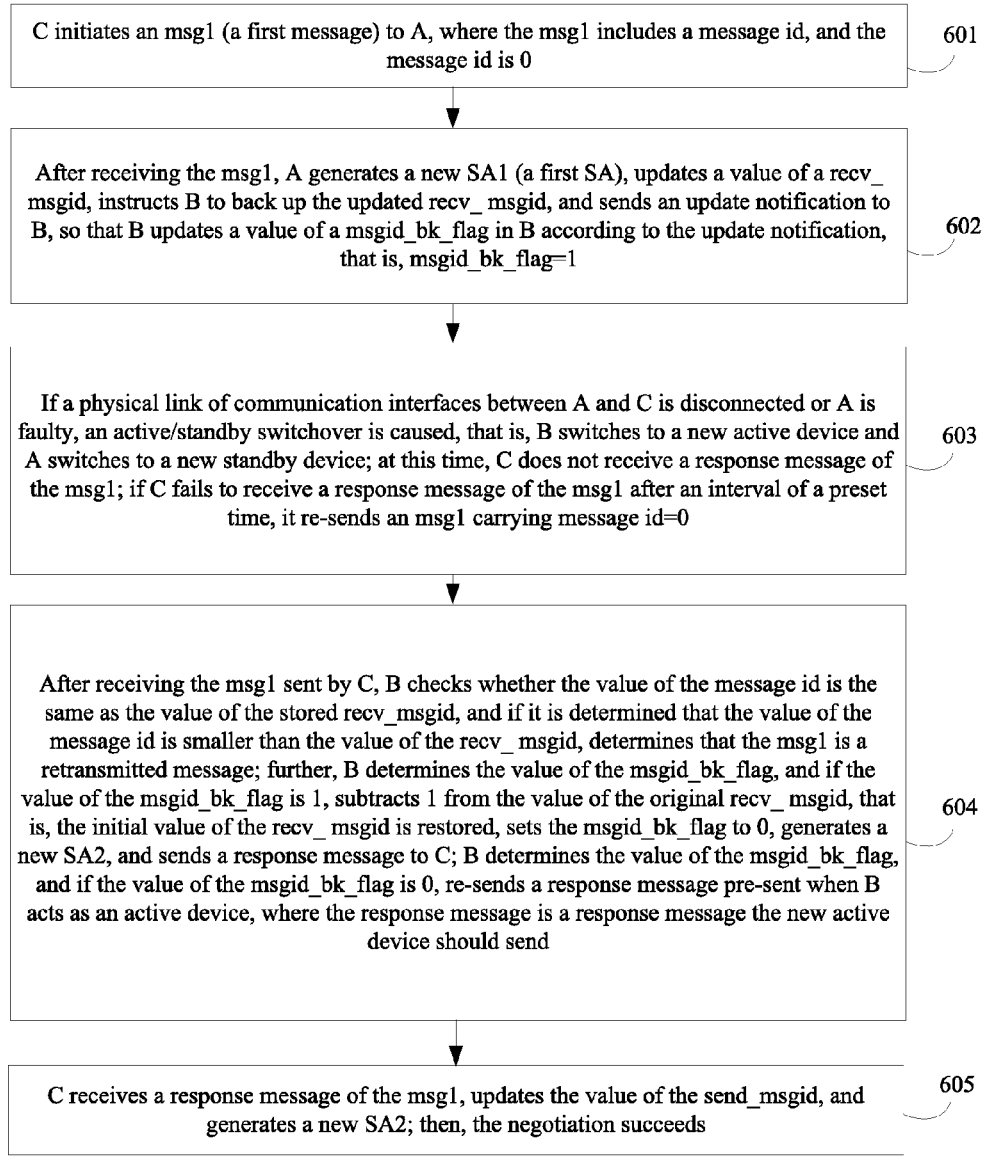
FIG. 6B is schematic flowchart of a method for negotiation based on IKE messages according to another embodiment of the present invention.

As shown in FIG. 6A and FIG. 6B, FIG. 6A illustrates a scenario of a method for negotiation based on IKE messages, and FIG. 6B is a schematic flowchart of a method for negotiation based on IKE messages according to an embodiment of the present invention. The method for negotiation based on IKE messages in this embodiment is described as follows:

In this embodiment, an identity msgid_bk_flag, that is, a third identity is added to an active device and a standby device at the same time.

601. C (a peer device) initiates an msg1 (a first message) to A (an active device), where the msg1 includes a message id, and a value of the message id is 0.

602. After receiving the msg1, A generates SA1 (a first SA), updates a value of a recv_msgid, instructs B (a standby device) to back up the updated recv_msgid, and sends an update notification to B, so that B updates the value of the msgid_bk_flag according to the update notification, that is, msgid_bk_flag=1.

At this time, in B, msgid_bk_flag=1, and recv_msgid=N+1.

In this embodiment, the updating the value of the msgid_bk_flag is as follows: An initial value of the msgid_bk_flag increases by 1, where the initial value of the msgid_bk_flag is 0, and the initial value of the recv_msgid is N (N is a natural number).

603. If a physical link of communication interfaces between A and C is disconnected or A is faulty, an active/standby switchover is caused, that is, B switches to a new active device and A switches to a new standby device; at this time, C does not receive a response message of the msg1; if C fails to receive a response message of the msg1 after an interval of a preset time, it re-sends an msg1 carrying message id=0.

604. After receiving the msg1 sent by C, B checks whether the value of the message id is the same as the value of the stored recv_msgid, and if it is determined that the value of the message id is smaller than the value of the recv_msgid, determines that the msg1 is a re-sent message.

Further, B determines the value of the msgid_bk_flag, and if the value of the msgid_bk_flag is 1, subtracts 1 from the value of the original recv_msgid, that is, the initial value of the recv_msgid is restored, sets the msgid_bk_flag to 0, generates a new SA2 (for example, an SA2 in FIG. 6A, that is, a second SA), and sends a response message (for example, a msg0 in FIG. 6A) to C.

B determines the value of the msgid_bk_flag, and if the value of the msgid_bk_flag is 0, re-sends a response message sent when B acts as an active device, where the response message is a response message the new active device should send and the response message includes the SA1 (that is, the first SA).

605. C receives a response message of the msg1, updates the value of the send_msgid, and generates an SA2; then, the negotiation succeeds.

Figure 6C:
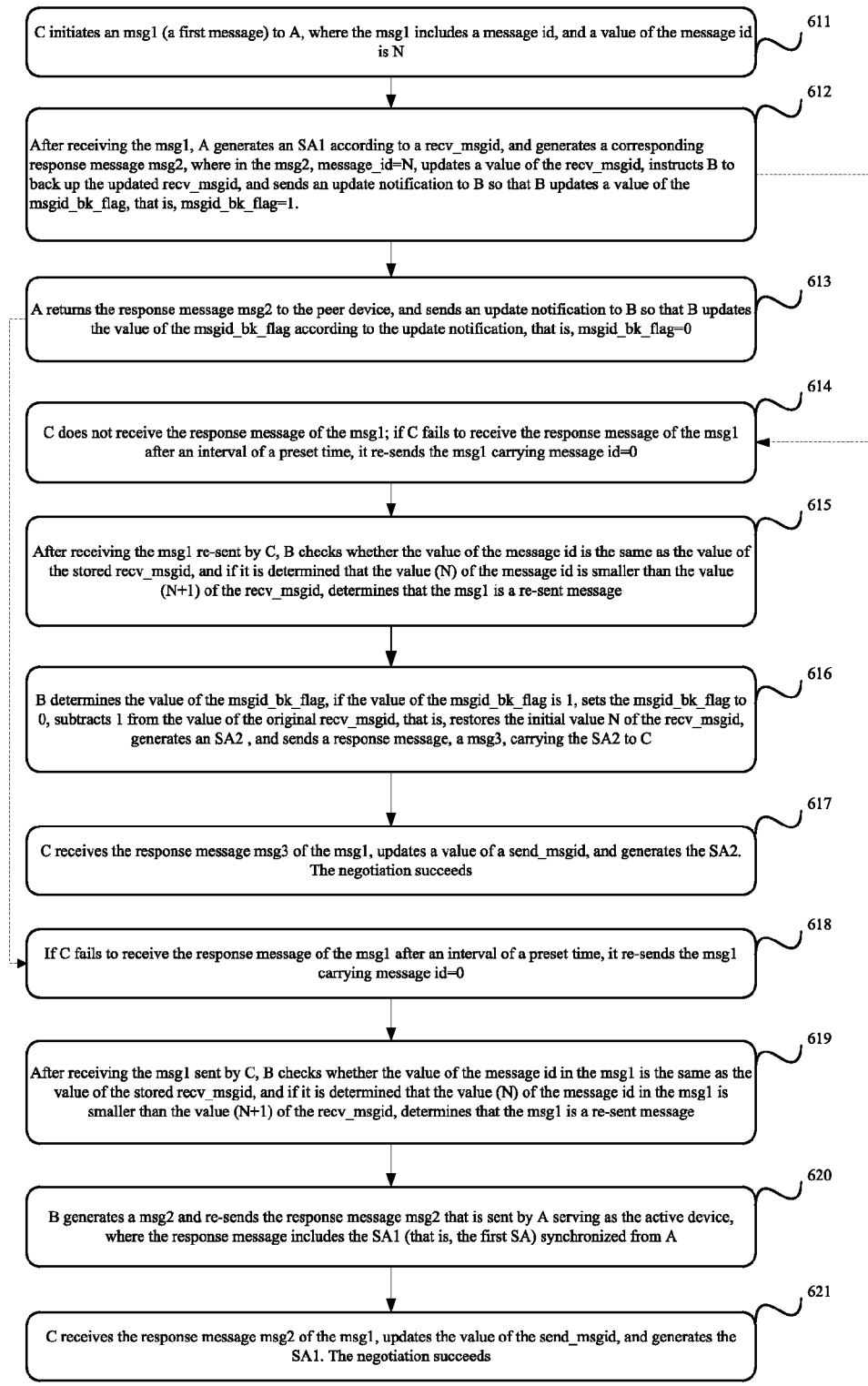
FIG. 6C is schematic flowchart of a method for negotiation based on IKE messages according to another embodiment of the present invention.

As shown in FIG. 6C and FIG. 6B, FIG. 6C illustrates a scenario of a method for negotiation based on IKE messages, and FIG. 6B is a schematic flowchart of a method for negotiation based on IKE messages according to an embodiment of the present invention. The method for negotiation based on IKE messages in this embodiment is described as follows:

In this embodiment, an identity msgid_bk_flag, that is, a third identity is added in a standby device.

611. C (a peer device) initiates an msg1 (a first message) to A (an active device), where the msg1 includes a message id, and a value of the message id is N.

612. After receiving the msg1, A generates an SA1 (a first SA) according to a recv_msgid, and generates a corresponding response message msg2, where in the msg2, message_id=N, updates a value of the recv_msgid, instructs B (the standby device) to back up the updated recv_msgid, and sends an update notification to B so that B updates a value of the msgid_bk_flag, that is, msgid_bk_flag=1.

At this time, in B, msgid_bk_flag=1 and recv_msgid=N+1.

In this embodiment, A updates the value of the msgid_bk_flag during processing on the msg1. Therefore, the updating the value of the msgid_bk_flag is setting the value of the msgid_bk_flag to 1. An initial value of the msgid_bk_flag is 0, and an initial value of the recv_msgid is N (N is a natural number).

If no active/standby switchover occurs at this time, step 613 is performed. If an active/standby switchover occurs, step 614 is performed.

613. A returns the response message msg2 to the peer device, and sends an update notification to B so that B updates the value of the msgid_bk_flag according to the update notification, that is, msgid_bk_flag=0.

If no active/standby switchover occurs, A waits to receive a next request message sent from C and performs processing similar to 611 on the next request message sent from C. No further details are provided herein. In this embodiment, a processing period of only one message is taken as an example for describing active/standby switchovers occur in different phases of the period. If an active/standby switchover occurs, step 618 is performed.

614. At this time, C does not receive the response message of the msg1; if C fails to receive the response message of the msg1 after an interval of a preset time, it re-sends the msg1 carrying message id=0.

615. After receiving the msg1 re-sent by C, B checks whether the value of the message id is the same as the value of the stored recv_msgid, and if it is determined that the value (N) of the message id is smaller than the value (N+1) of the recv_msgid, determines that the msg1 is a re-sent message.

616. B determines the value of the msgid_bk_flag, if the value of the msgid_bk_flag is 1, sets the msgid_bk_flag to 0, subtracts 1 from the value of the original recv_msgid, that is, restores the initial value N of the recv_msgid, generates an SA2 (for example, an SA2 in FIG. 6A, that is, a second SA), and sends a response message, for example, a msg3, carrying the SA2 to C.

617. C receives the response message msg3 of the msg1, updates a value of a send_msgid, and generates the SA2. The negotiation succeeds.

618. If C fails to receive the response message of the msg1 after an interval of a preset time, it re-sends the msg1 carrying message id=0. If C receives the msg2, it may send a next request message. B waits to receive the next request message sent from C, and processes the next request message sent from C. No further details are provided herein.

619. After receiving the msg1 sent by C, B checks whether the value of the message id in the msg1 is the same as the value of the stored recv_msgid, and if it is determined that the value (N) of the message id in the msg1 is smaller than the value (N+1) of the recv_msgid, determines that the msg1 is a re-sent message.

620. B generates a msg2 and re-sends the response message msg2 that is sent by A serving as the active device, where the response message includes the SA1 (that is, the first SA) synchronized from A.

621. C receives the response message msg2 of the msg1, updates the value of the send_msgid, and generates the SA1. The negotiation succeeds.

The method for negotiation based on IKE messages solves the problem in an IPSEC hot standby scenario where the msgids of two negotiating parties may not be matched and services may be interrupted due to an active/standby switchover in a process of IKE re-negotiation.

Figure 7A:
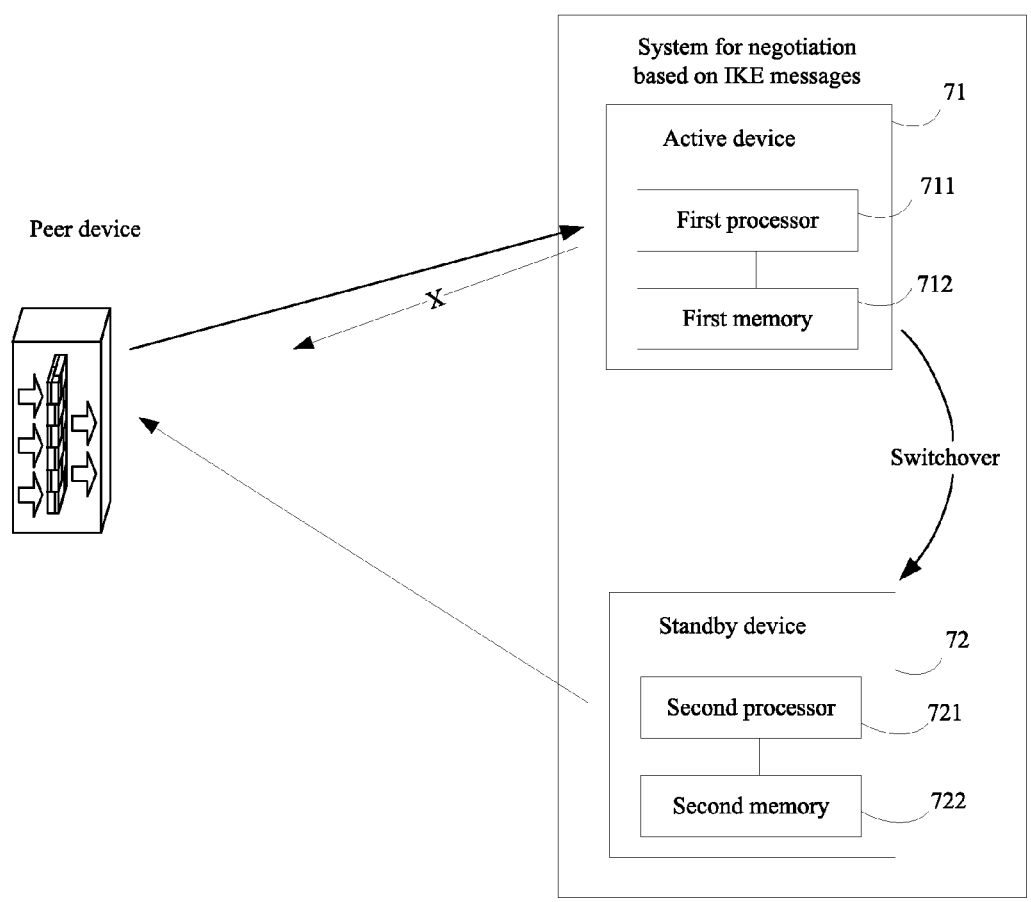
FIG. 7A is a schematic structural diagram of a system for negotiation based on IKE messages according to another embodiment of the present invention.
Figure 7B:
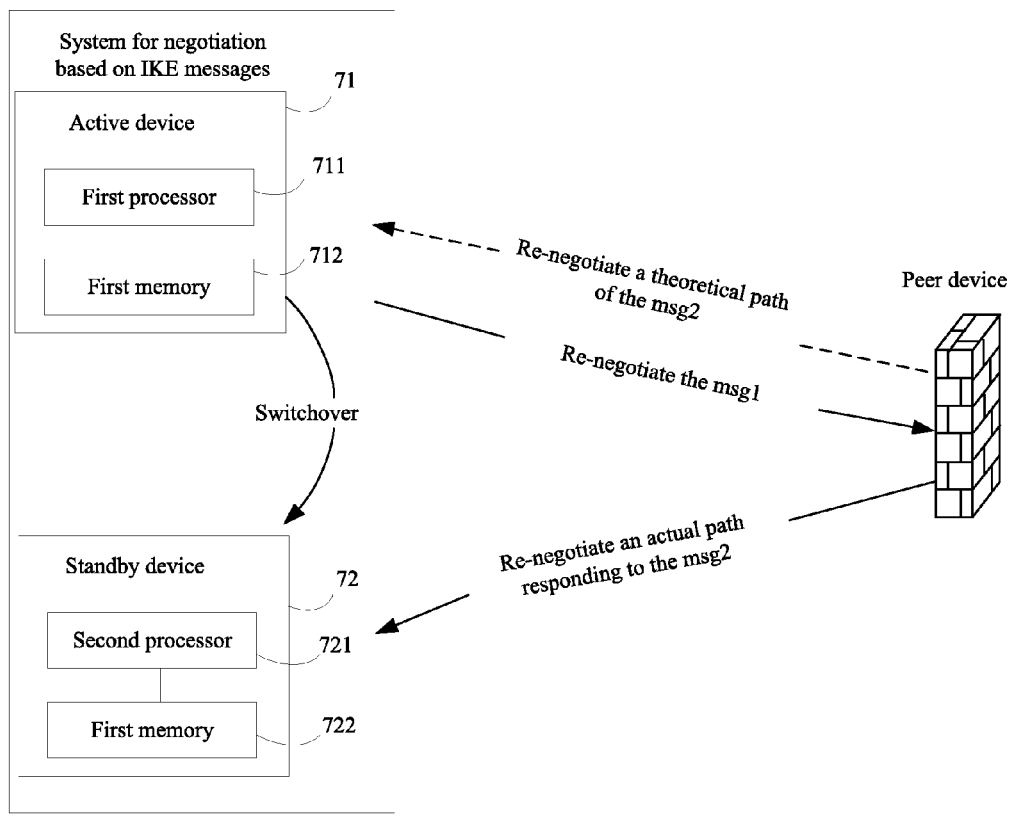
FIG. 7B is a schematic structural diagram of a system for negotiation based on IKE messages according to another embodiment of the present invention.

According to another aspect of the present invention, the present invention further provides a system for negotiation based on IKE messages. As shown in FIG. 7A and FIG. 7B, the system for negotiation based on IKE messages includes an active device 71 and a standby device 72.

The active device 71 includes a first processor 711 and a first memory 712; and the standby device 72 includes a second processor 721 and a second memory 722.

It should be noted that the first memory 712 stores a second identity, and the second memory 722 stores a third identity.

The second processor 721 is configured to update, according to an update notification of the first processor 711, a value of the third identity stored in the second memory 722, where the update notification of the first processor 711 is sent by the first processor 711 after updating a value of the second identity stored in the first memory 712; and when the standby device 72 switches to a new active device, the second processor 721 is configured to send, according to the updated third identity in the second memory 722, a second message for negotiating IPSec information to a peer device; where:

the third identity in the second memory is an identity used to acquire state information of the active device.

In an application scenario, as shown in FIG. 7A, when the system for negotiation based on IKE messages acts as an active sender in the negotiation based on IKE messages and before the second processor 721 is configured to update, according to an update notification of the first processor 711, a value of the third identity stored in the second memory 722, the first processor 711 is configured to send a first message for negotiating IPSec information to the peer device, where the first message carries a first identity; and the first processor 711 is further configured to update the value of the second identity stored in the first memory 712; where:

the second identity is an identity that is used to acquire state information of the active device 71.

For example, the first identity is message_id, the second identity is next_sendmsg_id, and the third identity is next_sendmsg_id.

In addition, an initial value of the first identity, an initial value of the second identity, and an initial value of the third identity are the same and are all N;

accordingly, that the first processor 711 is further configured to update the value of the second identity stored in the first memory 712 is specifically as follows:

the first processor 711 is further configured to update the value of the second identity in the first memory 712 to N+1; and that the second processor 721 is configured to update, according to an update notification of the first processor 711, a value of the third identity stored in the second memory 722 is specifically as follows:

the second processor 721 updates a value of the third identity in the second memory 722 to N+1.

Alternatively, that the second processor 721 is configured to send, according to the updated third identity in the second memory 722, a second message for negotiating IPSec information to a peer device is specifically as follows:

the second processor 722 sends a second message for negotiating IPSec information to a peer device, where a value of the first identity carried in the second message is N+1.

In a preferred application scenario, the second processor 721 is further configured to send a third message for negotiating IPSec information to the peer device, where a value of the first identity carried in the third message is N.

When the system for negotiation based on IKE messages acts as an active sender during the negotiation based on IKE messages, the problem in the prior art that when values of first identities of two negotiating parties are different in a process of IKEv2 negotiation, subsequent negotiations may no longer be continued and services are interrupted for a long time can be effectively solved.

In another application scenario, when the system for negotiation based on IKE messages acts as a passive receiver in the negotiation based on IKE messages, as shown in FIG. 7B, before the second processor 721 is configured to update, according to an update notification of the first processor 711, a value of the third identity stored in the second memory 722, the first processor 711 is configured to receive a first message for negotiating IPSec information, where the first message is sent by the peer device and carries a first identity; and the first processor 711 is further configured to update the value of the second identity stored in the first memory 712, and instruct the second processor 721 to back up the value of the second identity into the second memory 722.

For example, the first identity is message_id; the second identity is a recv_message_id; the third identity is an msgid_bk_flag; and initial values of both the first identity and the second identity are N, while the initial value of the third identity is 0;

accordingly, that the first processor 711 updates the value of the second identity stored in the first memory 712 is specifically as follows:

the first processor 711 updates the value of the second identity in the first memory 712 to be N+1; and that the second processor 721 is configured to update, according to an update notification of the first processor 711, a value of the third identity stored in the second memory 722 is specifically as follows:

the second processor 721 updates a value of the third identity in the second memory 722 to 1.

Further, that the second processor 721 is configured to send, according to the updated third identity in the second memory 722, a second message for negotiating IPSec information to a peer device specifically includes the following:

if the value of the third identity is 0, the second processor 721 re-sends a second message for negotiating IPSec information to the peer device, where a value of the first identity carried in the second message is N and the second message carries a first security association SA; and if the value of the third identity of is 1, the second processor 721 resets the value of the third identity to 0, updates the value of the second identity to N, and re-sends a second message for negotiating IPSec information to the peer device, where a value of the first identity carried in the second message is N and the second message carries a second SA.

When the system for negotiation based on IKE messages acts as a passive receiver during the negotiation based on IKE messages, the problem in the prior art that when values of first identities of two negotiating parties are different in a process of IKEv2 negotiation, subsequent negotiations may no longer be continued and services are interrupted for a long time can be effectively solved.

According to another aspect of the present invention, an embodiment of the present invention further provides a communications system, including any one of the systems for negotiation based on IKE messages provided in the present invention.

A person of ordinary skill in the art may understand that all or a part of the steps in each of the foregoing method embodiments may be implemented by a program instructing relevant hardware. The aforementioned program may be stored in a computer readable storage medium. When the program runs, the steps of the forgoing methods in the embodiments are performed. The storage medium includes any medium that is capable of storing program codes, such as a ROM, a RAM, a magnetic disk, or an optical disk.

Finally, it should be noted that the foregoing embodiments are merely intended for describing the technical solutions of the present invention, other than limiting the present invention. Although the present invention is described in detail with reference to the foregoing embodiments, a person of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. A method for negotiation based on internet key exchange (IKE) messages, the method comprising:
   sending, by an active device, a first message for negotiating IPSec information to a peer device, wherein the first message carries a first identity;
   updating, by a standby device, a value of a stored third identity according to an update notification of the active device, wherein the update notification of the active device is sent by the active device after the active device updates a value of a stored second identity during negotiating Internet Protocol Security (IPSec) information with the peer device;
   sending, by a new active device according to the updated third identity, a second message for negotiating IPSec information to the peer device when the standby device switches to a new active device; and
   sending a third message for negotiating IPSec information to the peer device, wherein a value of a first identity carried in the second message is different than a value of the first identity carried in the third message;
   wherein the third identity is an identity that is stored in the standby device and used to acquire state information of the active device; and
   wherein the state comprises an intermediate state and a stable state;
   wherein the first identity of the first message is message_id;
   wherein the second identity is next_sendmsg_id;
   wherein the third identity is next_sendmsg_id;
   wherein an initial value of the first identity of the first message, an initial value of the second identity, and an initial value of the third identity are the same and are all N;
   wherein the updating of the value of the stored second identity comprises updating, by the active device, the value of the stored second identity to N+1; and
   wherein the updating of the value of the stored third identity comprises updating, by the standby device, the value of the stored third identity to N+1.

2. The method according to claim 1, wherein before updating the value of a stored third identity, the method further comprises:
   updating, by the active device, the value of the stored second identity;

wherein the second identity is an identity that is stored in the active device and used to acquire state information of the active device.

3. The method according to claim 2, wherein sending the second message for negotiating IPSec information to a peer device comprises sending, by the new active device, the second message for negotiating IPSec information to a peer device, wherein the value of the first identity carried in the second message is N+1.

4. A method for negotiation based on internet key exchange (IKE) messages, the method comprising:
receiving, by an active device, a first message for negotiating Internet Protocol Security (IPSec) information, wherein the first message is sent by a peer device and carries a first identity;
updating, by the active device, a value of a second identity stored in the active device during negotiating IPSec information with the peer device, and instructing a standby device to back up the value of the second identity;
updating, by the standby device, a value of a stored third identity according to an update notification of an active device, wherein the update notification of the active device is sent by the active device after the active device updates the value of the stored second identity; and
sending, by a new active device, a second message to the peer device when the standby device switches to the new active device, the second message being generated according to the updated third identity, wherein the second message is a response message of the first message;
wherein the third identity is an identity that is stored in the standby device and used to acquire state information of the active device, the state comprising an intermediate state and a stable state, the third identity comprising a flag that is set to 0 or 1;
wherein the first identity is message_id;
wherein the second identity is recv_message_id;
wherein the third identity is msgid_bk_flag;
wherein initial values of the first identity and the second identity are N, and an initial value of the third identity is 0;
wherein the updating, by the active device, of the value of the stored second identity comprises updating, by the active device, the value of the stored second identity to N+1; and
wherein the updating, by the standby device, of the value of the stored third identity comprises updating, by the standby device, the value of the stored third identity to 1.

5. The method according to claim 4, wherein the value of the third identity is 1 and wherein sending, the second message to a peer device comprises:
resetting, by the new active device, the value of the third identity to 0;
updating the value of the second identity to N; and
generating a third message, wherein a value of the first identity carried in the third message is N, and the third message carries a second security association (SA).

6. The method according to claim 4, wherein, before the standby device switches to the new active device, the method further comprises:
sending, by the active device, the second message to the peer device, wherein a value of the first identity carried in the second message is N and the second message carries a first security association SA; and updating, by the standby device, the value of the stored third identity to 0 according to the update notification of the active device; and
wherein sending, by the new active device according to the updated third identity, the second message to a peer device comprises, if the value of the third identity is 0, re-sending the second message to the peer device.

7. The method according to claim 4, wherein sending, by the new active device, the second message for negotiating IPSec information to a peer device comprises:
if the value of the third identity is 0, re-sending a second message for negotiating IPSec information to the peer device, wherein a value of the first identity carried in the second message is N and the second message carries a first security association SA; and
if the value of the third identity is 1, resetting the value of the third identity to 0, updating the value of the second identity to N, and re-sending a second message for negotiating IPSec information to the peer device, wherein a value of the first identity carried in the second message is N and the second message carries a second SA.

8. A system for negotiation based on internet key exchange (IKE) messages, comprising:
an active device comprising a first processor and a first memory; and
a standby device comprising a second processor and a second memory;
wherein the first processor is configured to send a first message for negotiating IPSec information to a peer device, wherein the first message carries a first identity;
wherein the second processor is configured to update, according to an update notification of the first processor, a value of a third identity stored in the second memory, wherein the update notification of the first processor is sent by the first processor after updating a value of a second identity stored in the first memory during negotiating Internet Protocol Security (IPSec) information with the peer device;
wherein the second processor is configured to send, according to the updated third identity in the second memory, a second message for negotiating IPSec information to the peer device when the standby device switches to a new active device; and
wherein the second processor is configured to send a third message for negotiating IPSec information to the peer device, wherein a value of a first identity carried in the second message is different than a value of the first identity carried in the third message;
wherein the third identity in the second memory is an identity used to acquire state information of the active device, wherein the state comprises intermediate state and stable state;
wherein the first identity of the first message is message_id;
wherein the second identity is next_sendmsg_id;
wherein the third identity is next_sendmsg_id;
wherein an initial value of the first identity, an initial value of the second identity, and an initial value of the third identity are the same and are all N;
wherein the first processor is configured to update the value of the second identity stored in the first memory by updating the value of the second identity in the first memory to N+1; and wherein the second processor is configured to update the value of the third identity stored in the second memory by updating the value of the third identity in the second memory to N+1.

9. The system according to claim 8, wherein:
the first processor is further configured to update the value of the second identity stored in the first memory, wherein the second identity is an identity used to acquire the state information of the active device.

10. The system according to claim 8, wherein the second processor is configured to send the second message for negotiating IPSec information to a peer device by sending the second message for negotiating IPSec information to the peer device, wherein the value of the first identity carried in the second message is N+1.

11. The system according to claim 8, wherein the value of the first identity carried in the third message is N.

12. The system according to claim 8, wherein:
the first processor is configured to receive a first message for negotiating IPSec information before the second processor updates the value of a third identity stored in the second memory, wherein the first message is sent by the peer device and carries a first identity; and
the first processor is further configured to generate the update notification, to instruct the second processor to back up the value of the second identity into the second memory.

13. A system, comprising:
an active device comprising a first processor and a first memory; and
a standby device comprising a second processor and a second memory;
wherein the second processor is configured to update, according to an update notification of the first processor, a value of a third identity stored in the second memory, wherein the update notification of the first processor is sent by the first processor after updating a value of a second identity stored in the first memory during negotiating Internet Protocol Security (IPSec) information with a peer device;
wherein the second processor is configured to send, according to the updated third identity in the second memory, a second message for negotiating IPSec information to the peer device when the standby device switches to a new active device;
wherein the third identity in the second memory is an identity used to acquire state information of the active device, wherein the state comprises intermediate state and stable state;
wherein the first processor is configured to receive a first message for negotiating IPSec information before the second processor updates the value of a third identity stored in the second memory, wherein the first message is sent by the peer device and carries a first identity; and
wherein the first processor is further configured to generate the update notification, to instruct the second processor to back up the value of the second identity into the second memory;

wherein the first identity is message_id;
wherein the second identity is recv_message_id;
wherein the third identity is msgid_bk_flag;
wherein initial values of the first identity and the second identity are N;
wherein an initial value of the third identity is 0;
wherein the first processor is configured to upate the value of the second identity stored in the first memory by updating the value of the second identity in the first memory to N+1; and
wherein the second processor is configured to update the value of the third identity stored in the second memory by updating the value of a third identity in the second memory to 1.

14. The system according to claim 13, wherein the value of the third identity is 1 and wherein the second processor is configured to send the second message for negotiating IPSec information to a peer device specifically by resetting, by the second processor, the value of the third identity to 0, updating the value of the second identity to N, and generating a third message, wherein a value of the first identity carried in the third message is N and the third message carries a second SA.

15. The system according to claim 13, wherein the first processor is further configured to send the second message to the peer device before the standby device switches to a new active device, wherein a value of the first identity carried in the second message is N, and the second message carries a first security association SA; and
wherein the second processor is further configured to update the value of the stored third identity to 0 according to the update notification of the active device; and
wherein the second processor is configured to send the second message for negotiating Internet Protocol Security IPSec information to a peer device by re-sending the second message to the peer device when the value of the third identity is 0.

16. The system according to claim 13, wherein the second processor is configured to send the second message for negotiating IPSec information to a peer device by:
if the value of the third identity is 0, re-sending a second message for negotiating IPSec information to the peer device, wherein a value of the first identity carried in the second message is N and the second message carries a first security association SA; and
if the value of the third identity is 1, resetting the value of the third identity to 0, updating the value of the second identity to N, and re-sending a second message for negotiating IPSec information to the peer device, wherein a value of the first identity carried in the second message is N and the second message carries a second SA.

* * * * *